United States Patent [19]

Udipi et al.

[11] Patent Number: 5,200,498
[45] Date of Patent: Apr. 6, 1993

[54] LACTAM-LACTONE COPOLYMER

[75] Inventors: Kishore Udipi, Longmeadow; Lionel R. Stebbins, Belchertown, both of Mass.

[73] Assignee: Monsanto Company, St. Louis, Mo.

[21] Appl. No.: 827,438

[22] Filed: Jan. 29, 1992

[51] Int. Cl.$^5$ .............................................. C08G 69/14
[52] U.S. Cl. .................... 528/323; 528/312; 528/315; 528/318; 528/319
[58] Field of Search ............... 528/323, 312, 319, 315, 528/318

[56] References Cited

U.S. PATENT DOCUMENTS 3,342,785  9/1967  Blanchard ........................... 528/323
3,592,873  7/1971  Ishida et al. ........................ 528/323
4,528,361  7/1985  Sinclair ............................... 528/323

FOREIGN PATENT DOCUMENTS 17676   10/1966  Japan .
13026    7/1967  Japan .
1099456  1/1968  United Kingdom .

Primary Examiner—Harold D. Anderson
Attorney, Agent, or Firm—Mary R. Bonzagni

[57] ABSTRACT

Lactam-lactone copolymers are provided that range in properties from plastic to elastomer which are formed by reacting components of a polymerizable composition comprising: a lactam monomer; a lactone monomer; a $C_3$ to $C_{12}$ lactam magnesium halide catalyst; and an initiator.

18 Claims, No Drawings

LACTAM-LACTONE COPOLYMER

BACKGROUND OF THE INVENTION

The present invention relates to lactam-lactone copolymers and their process of preparation.

Polyamides as a class have a wide range of properties and therefore a wide range of applications. One important class of polyamides are the polylactams prepared by the polymerization of lactams such as caprolactam and the like. Polycaprolactam or nylon 6 is the most widely used of the polylactams. When nylon 6 is unsuitable for a particular application, polylactams other than polycaprolactam or copolylactams have been used. Included among these copolylactams are lactam-polyol-polyacyl lactam block terpolymers as disclosed and claimed in U.S. Pat. No. 4,223,112 to Hedrick et. al. Such block copolylactams are useful in the manufacture of fibers, fabrics, films, and molded articles.

For some applications (i.e., gaskets, molding compositions, processing aids for plastics) a copolylactam that can demonstrate a range in properties from hard and crystalline to rubbery and resembling polyurethanes in terms of mechanical behavior would be useful and in the later range could represent a low cost alternative to polyurethanes.

It is therefore an object of the present invention to provide a copolylactam having the above-specified range of properties.

It is a further object of the present invention to provide a process for making such copolylactams.

SUMMARY OF THE INVENTION

The present invention pertains to a polymerizable composition comprising:
a. a lactam monomer;
b. a lactone monomer;
c. a catalytically effective amount of a $C_3$ to $C_{12}$ lactam magnesium halide; and
d. an effective amount of an initiator capable of initiating lactam-lactone copolymerization in the presence of the $C_3$ to $C_{12}$ lactam magnesium halide catalyst.

The present invention further pertains to lactam-lactone copolymers prepared from these components and to the process for making such copolymers. These copolymers range in properties from plastic to elastomer depending on the amount of lactone monomer initially incorporated into the polymerizable composition.

DETAILED DESCRIPTION OF THE PREFERRED EMBODIMENTS

Lactam monomers

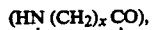

suitable for use in the present invention, contain from 3 to 11, and preferably, due to reactivity and availability, 3 or 5 alkylene groups. A preferred monomer is ε-caprolactam. Lactam monomers in addition to ε-caprolactam include: α-pyrrolidinone, piperidone, valerolactam, caprolactams other than the ε-isomer, capryllactam, lauryllactam and the like. In addition to lactams unsubstituted on their carbon chains, lactams having substituents on the carbon chain which do not inhibit or otherwise adversely affect the copolymerization of the lactam-lactone monomers are also included within the scope of this invention. It is preferred that the lactam monomer be present in an amount ranging from about 99 to 1%; preferably from about 80 to 30%; and more preferably from about 60 to 30% by weight based on the total weight of the lactam and lactone monomer components.

Suitable lactone monomers

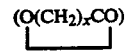

contain from 3 to 11 and, preferably, 3 or 5 alkylene groups with ε-caprolactone being preferred. Lactone monomers in addition to ε-caprolactone include: β-propiolactone, β-butyrolactone, α,α-bis(chloromethyl)-propiolactone, δ-valerolactone, α,β,γ-trimethoxy-δ-valerolactone, 1,4-dioxane-2-one, glycolide, lactide, 1,4-dithiane-2,5-dione, β-methyl-ε-isopropyl-ε-caprolactone, lactone of 4-hydroxycyclohexane carboxylic acid, cis-disalicylide, di-o-cresotide and trisalicylide. It is preferred that the lactone monomer be present in an amount ranging from about 1 to 99%; preferably from about 20 to 70%; and more preferably from about 40 to 70% by weight based on the total weight of the monomer components.

Suitable catalysts for lactam-lactone copolymerization are magnesium catalysts including $C_3$ to $C_{12}$ lactam magnesium halides, preferably derived from lactam monomers selected from the group consisting of ε-caprolactam and 2-pyrrolidinone. Preferably, these magnesium catalysts are selected from the group including ε-caprolactam magnesium bromide, (2-oxo-1-tetrahydroazepinyl magnesium bromide), 2-pyrrolidinone magnesium bromide, and (2-oxo-1-pyrrolidinyl magnesium bromide) with ε-caprolactam magnesium bromide being the most preferred. The amount of catalyst used for the practice of the present invention is an amount which gives an appreciable rate of copolymerization. Preferably, the amount of catalyst is in the range of from about 2 millimoles (mMoles) (mM) to about 25 millimoles (mMoles) (mM) and preferably from about 8 mMoles to about 15 mMoles per 100 grams of the monomer components. The reaction rate is dependent on other parameters such as the temperature at which the reaction is being carried out in addition to the catalyst concentration.

Initiators contemplated in the present invention are those initiators capable of initiating lactam-lactone copolymerization in the presence of the $C_3$ to $C_{12}$ lactam magnesium halide catalyst. These initiators include, but are not limited to, caprolactams such as adipoyllactams; isocyanates and blocked isocyanates; isophthaloyl bis-caprolactam, terephthaloyl biscaprolactam; esters such as dimethylphthalate-polyethylene glycol; prepolymers of polyols or polydienes in combination with bis acid chlorides; carbonylbiscaprolactam made by reacting phosgene with caprolactam; phosphoryl initiators of the type described in U.S. Pat. Nos. 4,649,177; 4,645,800; 4,617,355 and 4,628,075 which are incorporated herein by reference. The preferred initiator is isophthaloyl biscaprolactam. Generally, the amount of initiator used is in the range of from about 1 mMole to about 10 mMoles and preferably from about 3 mMoles to about 6 mMoles per 100 grams of the monomer components.

In preparing the lactam-lactone copolymers of the present invention, a lactam monomer and a lactone monomer are weighed out and heated in separate vessels to from about 110° C. to about 140° C. A catalytically effective amount of a magnesium catalyst is added to and dissolved in the heated lactam monomer and an effective amount of an initiator is added to and dissolved in the heated lactone monomer. The heated solution of magnesium catalyst in lactam monomer and the heated solution of initiator in lactone monomer are admixed and immediately introduced into a RIM type mold or pultrusion apparatus which is maintained at the polymerization temperature of about at least 120° C. Examples of RIM type pultrusion apparatuses are disclosed by C.R. Wheeler in U.S. Pat. No. 4,635,432 and by H. Ishida in EPO Application No. 0 384 063 both of which are incorporated herein by reference. Polymerization may be initiated and completed within a relatively short period of time from 1 minute to less than 5 minutes.

Mixing of the catalyst/lactam monomer solution and initiator/lactone monomer solution may be carried out by those methods well known in the art of fast reaction polymerization chemistry. These include injecting separate streams of catalyst/lactam monomer solution and initiator/ lactone monomer solution into a mixing zone; mixing in a separate container, etc. The mixing zone may use static mixing or dynamic mixing devices. Preferred mixing techniques are those that cause rapid mixing while transferring the reacting mixture into the mold or pultrusion die.

In the preparation of the inventive lactam-lactone copolymers, it may be desirable to conduct the polymerization reaction in the presence of one or more conventional additives such as fillers, plasticizers, flame retardants, stabilizers, reinforcing agents such as glass fibers, graphite and mineral clay, dyes, and pigmenting materials. Such additives may be introduced provided they do not adversely interact with the initiator and/or catalyst and significantly impair the rate of polymerization.

In addition to the above description, the lactam-lactone copolymers of the present invention are further developed by reference to the illustrative, but not limiting, examples set forth below.

SPECIFIC EMBODIMENTS

In the examples set forth below, the following components were used:

Monomer 1—caprolactam monomer (<100 ppm moisture), having a melting point of about 69° C., used as received.

Monomer 2—caprolactone monomer, available from Interox Chemicals Ltd., was distilled prior to use.

Catalyst—a magnesium bromide caprolactam adduct with a melting point of about 70° C. having a concentration of 1.0 mole of magnesium bromide per kilogram of caprolactam (21.6 wt. % adduct; 78.4 wt. % caprolactam) obtained from Grant Chemical Division of Ferro Corporation of Baton Rouge, La.

Initiator—isophthaloyl biscaprolactam prepared by adding one (1) mole of bisacyldichloride to two (2) moles of caprolactam. The HCl formed was neutralized with an amine and the product recovered.

The examples set forth below were prepared according to the following method.

Monomer 1 and Monomer 2 were charged to separate vessels and heated to about 130° C. Care was taken to reduce or eliminate exposure of the monomer components to moisture.

The catalyst was dissolved in Monomer 1 (hereinafter referred to as Reactant A) and the initiator was dissolved in Monomer 2 (hereinafter referred to as Reactant B).

Upon dissolution, Reactant A was immediately added to Reactant B. The resulting mixture was agitated for approximately 5 seconds and the mixture poured into a RIM type vertical, teflon-lined mold preheated to approximately 160° C. Polymerization times ranged from about 1 to about 5 minutes depending on the amount of caprolactone monomer with more time required with increased amounts of caprolactone monomer.

The square, teflon-lined mold outwardly measured 33 cm ×15 cm ×33 cm.

The resulting molded plaque sizes were approximately 17.8 cm ×17.8 cm ×0.32 cm. Test bars were routed from the plaques and subjected to the following tests:

Notched Izod Impact - ASTM Test No. D-256-84 using 12.7 cm ×1.3 cm ×0.32 cm bars. Results are given in Joules (J)/meter (m).

Tensile Properties - ASTM Test No. D-638-86 using 16.5 cm ×1.3 cm ×0.32 cm bars.

EXAMPLES 1 TO 6

In Examples 1 to 6, several copolymers with varying ratios of the two monomer components were evaluated for tensile and impact properties. The results are set forth in Table I.

TABLE I

| EXAMPLE | SUMMARY OF EXAMPLE 1 TO 6 | | | | | |
|---|---|---|---|---|---|---|
|  | 1 | 2 | 3 | 4 | 5 | 6 |
| Monomer 1/Monomer 2 (%) | 100/0 | 90/10 | 80/20 | 60/40 | 50/05 | 30/70 |
| Monomer 1 (gms) | 108.0 | 96 | 84.2 | 60.2 | 48.0 | 24.0 |
| Monomer 2 (gms) | 0 | 12 | 24 | 48 | 60 | 84.0 |
| Catalyst |  |  |  |  |  |  |
| (gms) | 15.0 | 15.0 | 15.0 | 15.0 | 15.0 | 15.0 |
| (mM) | 12.5 | 12.5 | 12.5 | 12.5 | 12.5 | 12.5 |
| Initiator |  |  |  |  |  |  |
| (gms) | 2.0 | 2.0 | 2.0 | 2.0 | 2.0 | 2.0 |
| (mM) | 4.7 | 4.7 | 4.7 | 4.7 | 4.7 | 4.7 |
| PROPERTIES: |  |  |  |  |  |  |
| Notched Izod (J/m) | 67.5 | 59.3 | 175.2 | NB | NB | NB |
| Tensile Stress |  |  |  |  |  |  |
| at yield (MPa) | 91.8 | 58.1 | 5.12 | 3.25 | 1.26 | 0.246 |
| at break (MPa) | 91.1 | 54.1 | 36.4 | 16.6 | 8.3 | 2.37 |
| Tensile Modulus (GPa) | 3.91 | 2.77 | 1.58 | 0.31 | 0.101 | 0.03 |
| Tensile Elongation (%) | 5.0 | 23.2 | >50 | >100 | >100 | >100 |

NB = Test bar did not break.

Examples 1 to 6 demonstrate that copolymers having caprolactone levels of 20 percent or higher show noteworthy improvement in impact and tensile elongation properties.

In Examples 1 and 2, where the caprolactone levels are 0 and 10% respectively, the resulting copolymer is hard and crystalline and understandably demonstrates only moderate overall mechanical properties. In comparison, Examples 3 to 6, where the caprolactone levels ranged from 20 to 70%, tended to be rubbery with Examples 4 to 6 resembling polyurethane in their overall mechanical behavior.

We claim:

1. A polymerizable composition comprising:
    a. a lactam monomer;
    b. a lactone monomer;
    c. a catalytically effective amount of a $C_3$ to $C_{12}$ lactam magnesium halide; and
    d. an effective amount of an initiator capable of initiating lactam-lactone copolymerization in the presence of the $C_3$ to $C_{12}$ lactam magnesium halide catalyst.

2. The polymerizable composition of claim 1 wherein the ratio of lactam monomer to lactone monomer is from about 99:1 to about 1:99.

3. The polymerizable composition of claim 2 wherein the ratio of lactam monomer to lactone monomer is from about 80:20 to about 30:70.

4. The polymerizable composition of claim 1 wherein the catalytically effective amount of the $C_3$ to $C_{12}$ lactam magnesium halide catalyst is from about 2 mMoles to about 25 mMoles per 100 grams of components (a) and (b); and wherein the effective amount of the initiator is from about 1 mMole to about 10 mMoles per 100 grams of components (a) and (b).

5. The polymerizable composition of claim 4 wherein the catalytically effective amount of the $C_3$ to $C_{12}$ lactam magnesium halide catalyst is from about 8 mMoles to about 15 mMoles per 100 grams of components (a) and (b); and wherein the effective amount of the initiator is from about 3 mMoles to about 6 mMoles per 100 grams of components (a) and (b).

6. The polymerizable composition of claim 1 wherein the $C_3$ to $C_{12}$ lactam magnesium halide catalyst is magnesium bromide caprolactam.

7. The polymerizable composition of claim 1 wherein the initiator is selected from the group consisting of caprolactams; isocyanates and blocked isocyanates; isophthaloyl biscaprolactam, terephthaloyl biscaprolactam; esters; prepolmers of polyols or polydienes in combination with bis acid chlorides; carbonylbiscaprolactam and phosphoryl bislactams.

8. The polymerizable composition of claim 7 wherein the initiator is isophthaloyl biscaprolactam.

9. A process for preparation of a lactam-lactone copolymer which comprises:
    a. heating a lactam monomer and a lactone monomer in separate vessels to from about 110° C. to about 140° C.;
    b. dissolving a catalytically effective amount of a $C_3$ to $C_{12}$ lactam magnesium halide catalyst in the heated lactam monomer to from Reactant A;
    c. dissolving an effective amount of an initiator in the heated lactone monomer to form Reactant B;
    d. combining Reactant A and Reactant B with agitation to form a mixture;
    e. conveying the mixture to an apparatus preheated to about at least 120° C.; and
    f. polymerizing the mixture to a copolymer.

10. The process of claim 9 wherein the ratio of lactam monomer to lactone monomer is from about 99:1 to about 1:99.

11. The process of claim 10 wherein the ratio of lactam monomer to lactone monomer is from about 80:20 to about 30:70.

12. The process of claim 9 wherein the catalytically effective amount of the $C_3$ to $C_{12}$ lactam magnesium halide catalyst is from about 2 mMoles to about 25 mMoles per 100 grams of the lactam and lactone monomer components; and wherein the effective amount of the initiator is from about 1 mMole to about 10 mMoles per 100 grams of the lactam and lactone monomer components.

13. The process of claim 12 wherein the catalytically effective amount of the $C_3$ to $C_{12}$ lactam magnesium halide catalyst is from about 8 mMoles to about 15 mMoles per 100 grams of the lactam and lactone monomer components; and wherein the effective amount of the initiator is from about 3 mMoles to about 6 mMoles per 100 grams of the lactam and lactone monomer components.

14. The process of claim 9 wherein the $C_3$ to $C_{12}$ lactam magnesium halide catalyst is magnesium bromide caprolactam.

15. The process of claim 9 wherein the initiator is selected from the group consisting of caprolactams; isocyanates and blocked isocyanates; isophthaloyl biscaprolactam, terephthaloyl biscaprolactam; esters; prepolymers of polyols or polydienes in combination with bis acid chlorides; carbonylbiscaprolactam and phosphoryl bislactams.

16. The process of claim 15 wherein the initiator is isophthaloyl biscaprolactam.

17. The process of claim 9 wherein the reacting mixture is conveyed to a, Reaction-Injection Molding pultrusion apparatus.

18. The process of claim 9 wherein the reacting mixture is conveyed to a Reaction-Injection Molding processing system mold.

* * * * *

UNITED STATES PATENT AND TRADEMARK OFFICE
CERTIFICATE OF CORRECTION

PATENT NO. : 5,200,498
DATED : APRIL 6, 1993
INVENTOR(S) : KISHORE UDIPI ET AL.

It is certified that error appears in the above-identified patent and that said Letters Patent is hereby corrected as shown below:

Column 4, line 38, change "impaot" to --impact--

Column 4, Table 1, line 52, change _50/05" to --50/50--

Col. 6, claim 9, line 8, change "from" to --form--

Col. 5, claim 1, line 18, change "$c_{12}$" to --$C_{12}$--.

Col. 5, claim 7, line 52, change "prepolmers" to --prepolymers--.

Col. 6, claim 17, line 2, delete ",".

Col. 1, line 68, change "Within" to --within--

Signed and Sealed this

Seventh Day of December, 1993

Attest:

BRUCE LEHMAN

Attesting Officer

Commissioner of Patents and Trademarks